(12) United States Patent
Hu et al.

(10) Patent No.: US 11,493,728 B2
(45) Date of Patent: Nov. 8, 2022

(54) LENS DRIVING SYSTEM AND CIRCUIT MODULE THEREOF

(71) Applicant: TDK TAIWAN CORP., Taoyuan (TW)

(72) Inventors: Chao-Chang Hu, Taoyuan (TW); Yi-Liang Chan, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 183 days.

(21) Appl. No.: 16/928,532

(22) Filed: Jul. 14, 2020

(65) Prior Publication Data

US 2020/0341235 A1 Oct. 29, 2020

Related U.S. Application Data

(63) Continuation of application No. 15/958,275, filed on Apr. 20, 2018, now Pat. No. 10,746,956.

(30) Foreign Application Priority Data

Jun. 29, 2017 (CN) .......................... 201710516548.5

(51) Int. Cl.
| | | |
|---|---|---|
| *G02B 7/04* | (2021.01) | |
| *G02B 7/09* | (2021.01) | |
| *G03B 13/36* | (2021.01) | |
| *H02K 41/035* | (2006.01) | |
| *G02B 7/08* | (2021.01) | |
| *G02B 27/64* | (2006.01) | |
| *G03B 5/02* | (2021.01) | |
| *G03B 3/10* | (2021.01) | |

(52) U.S. Cl.
CPC ................. *G02B 7/09* (2013.01); *G02B 7/08* (2013.01); *G02B 27/646* (2013.01); *G03B 3/10* (2013.01); *G03B 5/02* (2013.01); *G03B 13/36* (2013.01); *H02K 41/0356* (2013.01); *G03B 2205/0015* (2013.01); *G03B 2205/0069* (2013.01)

(58) Field of Classification Search
CPC .............. G02B 7/04; G02B 7/09; G02B 7/10
See application file for complete search history.

(56) References Cited

U.S. PATENT DOCUMENTS

2016/0258425 A1 9/2016 Ladwig et al.
2020/0081219 A1* 3/2020 Park .......................... G02B 7/08

* cited by examiner

*Primary Examiner* — Joseph P Martinez
(74) *Attorney, Agent, or Firm* — Muncy, Geissler, Olds & Lowe, P.C.

(57) ABSTRACT

A circuit module is provided and includes a metal substrate, an insulating layer, and a circuit element. The metal substrate includes a main body, a bent portion, and an opening. The opening is formed between the main body and the bent portion, and the bent portion is bent relative to the main body. The insulating layer is disposed on the metal substrate. The circuit element is disposed on the insulating layer and is extended across the opening.

19 Claims, 6 Drawing Sheets

LENS DRIVING SYSTEM AND CIRCUIT MODULE THEREOF

CROSS REFERENCE TO RELATED APPLICATIONS

The present application is a continuation application of the U.S. patent application Ser. No. 15/958,275, filed on Apr. 20, 2018, which claims the benefit of China Application No. 201710516548.5 filed on Jun. 29, 2017, the entirety of which is incorporated by reference herein.

BACKGROUND OF THE DISCLOSURE

Field of the Disclosure

The present disclosure relates to a lens driving system and a circuit module thereof, and more particularly to a lens driving system and a circuit module having a metal substrate.

Description of the Related Art

As technology has progressed, many kinds of electronic devices, such as tablet computers and smartphones, have included the functionality of digital photography or video recording. A user can operate the electronic device to capture various images using the camera module of the electronic device.

In general, a camera module includes a base and a lens driving unit, and the lens driving unit can be configured to drive a lens to move along an optical axis of a lens relative to the base. However, when the thickness of the electronic device needs to be decreased further to achieve the purpose of miniaturization, the thickness of the camera module must be decreased as well.

Therefore, how to decrease the overall thickness of the camera module and maintain the structural strength of the camera module at the same time is an important subject for further research and development.

BRIEF SUMMARY OF THE DISCLOSURE

Accordingly, one objective of the present disclosure is to provide a lens driving system and a circuit module thereof, so as to solve the above problems.

According to some embodiments of the disclosure, the circuit module includes a metal substrate, an insulating layer and a circuit element. The metal substrate includes a main body, a bent portion and an opening. The opening is formed between the main body and the bent portion, and the bent portion is bent relative to the main body. The insulating layer is disposed on the metal substrate. The circuit element is disposed on the insulating layer and is extended across the opening.

In some embodiments, the circuit module further comprises a protecting layer which covers the circuit element.

In some embodiments, the circuit module further includes a circuit board, the circuit board includes a first coil, and the circuit board is disposed on the metal substrate using surface mount technology.

In some embodiments, the circuit board includes a first contact, the metal substrate includes a second contact, the first contact is electrically connected to the first coil, and the first contact and the second contact are electrically connected to each other via solder.

In some embodiments, the circuit board includes a first metal pad, the metal substrate includes a second metal pad, and the first metal pad and the second metal pad are connected to each other via solder.

In some embodiments, the first contact or the second contact has a circular structure.

In some embodiments, the area of the insulating layer is larger than the area of the circuit element.

In some embodiments, the circuit module further includes a circuit board, and the area of the insulating layer is larger than the area of the circuit board.

According to another embodiment of the disclosure, a lens driving system for driving a lens unit, and the lens driving system includes the circuit module mentioned before, a frame and a lens driving assembly. The frame movably contains the lens unit. The lens driving assembly includes a second coil and a magnetic element corresponding to the second coil, configured to drive the lens unit to move along an optical axis of the lens unit relative to the frame. The second coil is electrically connected to the metal substrate, and the first coil and the second coil are disposed on the same side of the metal substrate.

In some embodiments, the lens driving system further includes a damping element, which connects the frame with the circuit module.

In some embodiments, the lens driving system further includes a resilient element, and a through hole and an electrical connecting portion are formed on the metal substrate The electrical connecting portion is disposed inside the through hole, and the resilient element is extended through the through hole and is electrically connected to a wire on the insulating layer via the electrical connecting portion.

In some embodiments, the lens driving system further includes a metal cover, and the metal cover and the metal substrate are welded to each other.

In conclusion, the present disclosure provides a lens driving system for driving an optical lens for focusing. The metal substrate of the circuit module is directly adopted in the lens driving system to serve as a base. Therefore, in contrast to the conventional base made of a plastic material, the thickness of the metal substrate can be smaller and the structural strength is better, so as to achieve the purpose of the miniaturization of the lens driving system.

More specifically, several first contacts are disposed on the circuit board, and several corresponding second contacts are disposed on the metal substrate. The first contacts and the second contacts can be connected to each other via the solder, so that the circuit board is electrically connected to the metal substrate. Moreover, several first metal pads are disposed on the circuit board, and several corresponding second metal pads are disposed on the metal substrate. The first metal pads and the second metal pads can be connected to each other via the solder, so as to fix and position the circuit board on the metal substrate. There can be no additional positioning structure, so that the manufacturing cost is reduced, and the purpose of mechanical miniaturization can be achieved.

In addition, because the lens driving system adopts the metal substrate, the lines of magnetic force between the magnetic elements and the first coil can be guided by the metal substrate to be more concentrated. Therefore, the current for driving the first coil can be smaller, so as to decrease the power consumption of the lens driving system.

Additional features and advantages of the disclosure will be set forth in the description which follows, and, in part, will be obvious from the description, or can be learned by practice of the principles disclosed herein. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

DETAILED DESCRIPTION OF THE ILLUSTRATIVE EMBODIMENTS

Figure 1:
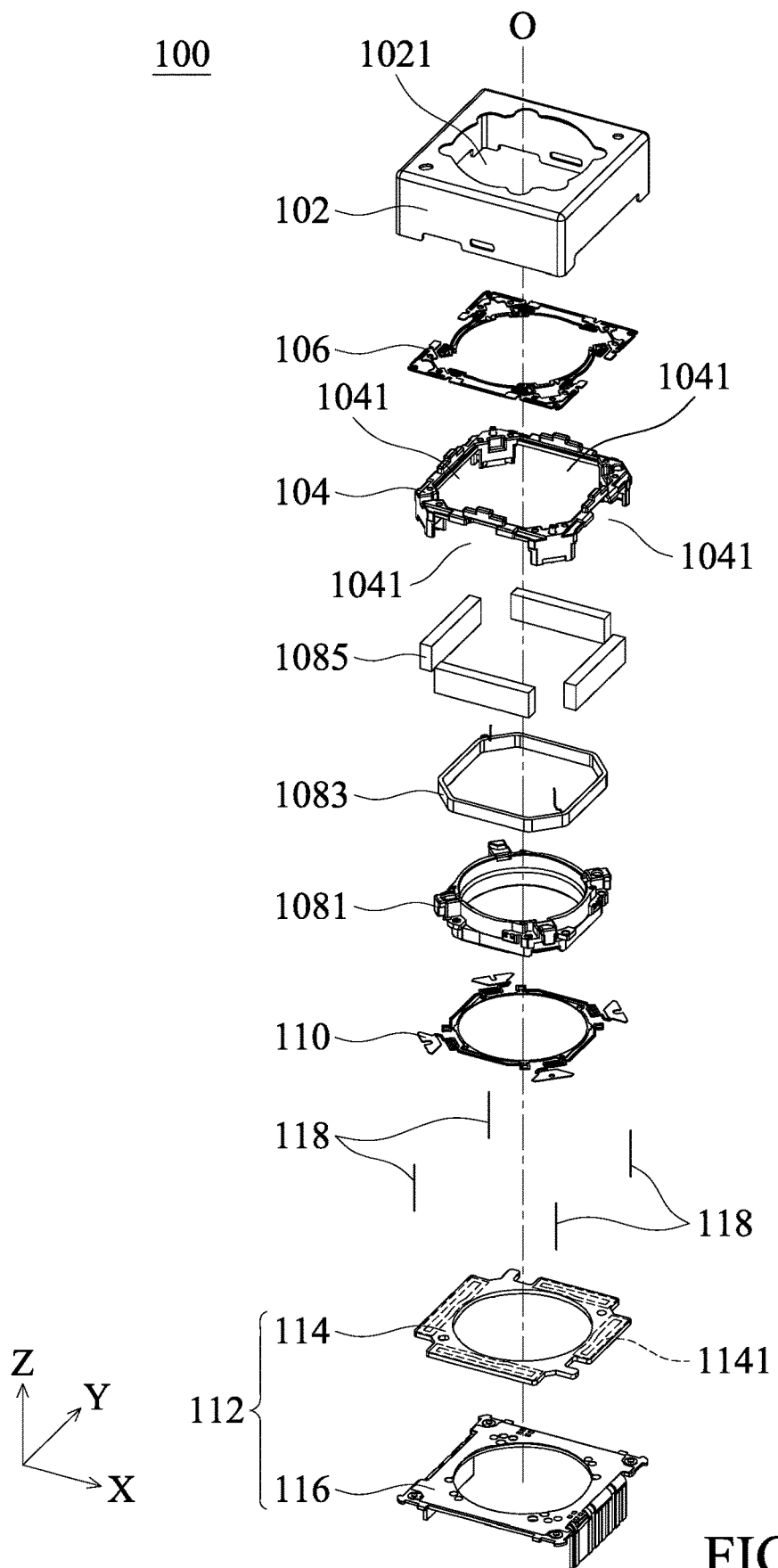
FIG. 1 is an exploded diagram of a lens driving system according to an embodiment of the disclosure.

In the following detailed description, for the purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept may be embodied in various forms without being limited to those exemplary embodiments. In addition, the drawings of different embodiments may use like and/or corresponding numerals to denote like and/or corresponding elements in order to clearly describe the present disclosure. However, the use of like and/or corresponding numerals in the drawings of different embodiments does not suggest any correlation between different embodiments. The directional terms, such as "up", "down", "left", "right", "front" or "rear", are reference directions for accompanying drawings. Therefore, using the directional terms is for description instead of limiting the disclosure.

In this specification, relative expressions are used. For example, "lower", "bottom", "higher" or "top" are used to describe the position of one element relative to another. It should be appreciated that if a device is flipped upside down, an element at a "lower" side will become an element at a "higher" side.

The terms "about" and "substantially" typically mean +/−20% of the stated value, more typically +/−10% of the stated value and even more typically +/−5% of the stated value. The stated value of the present disclosure is an approximate value. When there is no specific description, the stated value includes the meaning of "about" or "substantially".

Please refer to FIG. 1, which is an exploded diagram of a lens driving system 100 according to an embodiment of the disclosure. The lens driving system 100 can be used to hold a lens and can be installed in several electronic devices or portable electronic devices, for allowing the user to perform the image capturing function. As shown in FIG. 1, the lens driving system 100 includes a metal cover 102, a frame 104, an upper spring sheet 106, a lens holder 1081, a second coil 1083, four magnetic elements 1085, an lower spring sheet 110 and a circuit module 112. The metal cover 102 is connected to the circuit module 112, and the metal cover 102 has an accommodating space 1021, and the accommodating space 1021 is configured to accommodate the frame 104, the upper spring sheet 106, the lens holder 1081, the second coil 1083, the magnetic elements 1085 and the lower spring sheet 110. In addition, the circuit module 112 includes a circuit board 114 and a metal substrate 116. The circuit board 114 is disposed on the metal substrate 116, and the circuit board 114 can have four first coils 1141 in the circuit board 114, but the number of first coils 1141 is not limited this embodiment. In this embodiment, the first coil 1141 can be a plate coil, but it is not limited thereto. Furthermore, it should be noted that, in this embodiment, the metal substrate 116 is made of a metal material having low magnetic conductivity or having no magnetic conductivity, such as iron-containing alloy. The metal cover 102 and the metal substrate 116 can be connected to each other in a manner of welding. The manner of connecting the metal cover 102 to the metal substrate 116 is not limited to this embodiment. For example, the metal cover 102 can be stuck to the metal substrate 116 with glue.

Figure 2:
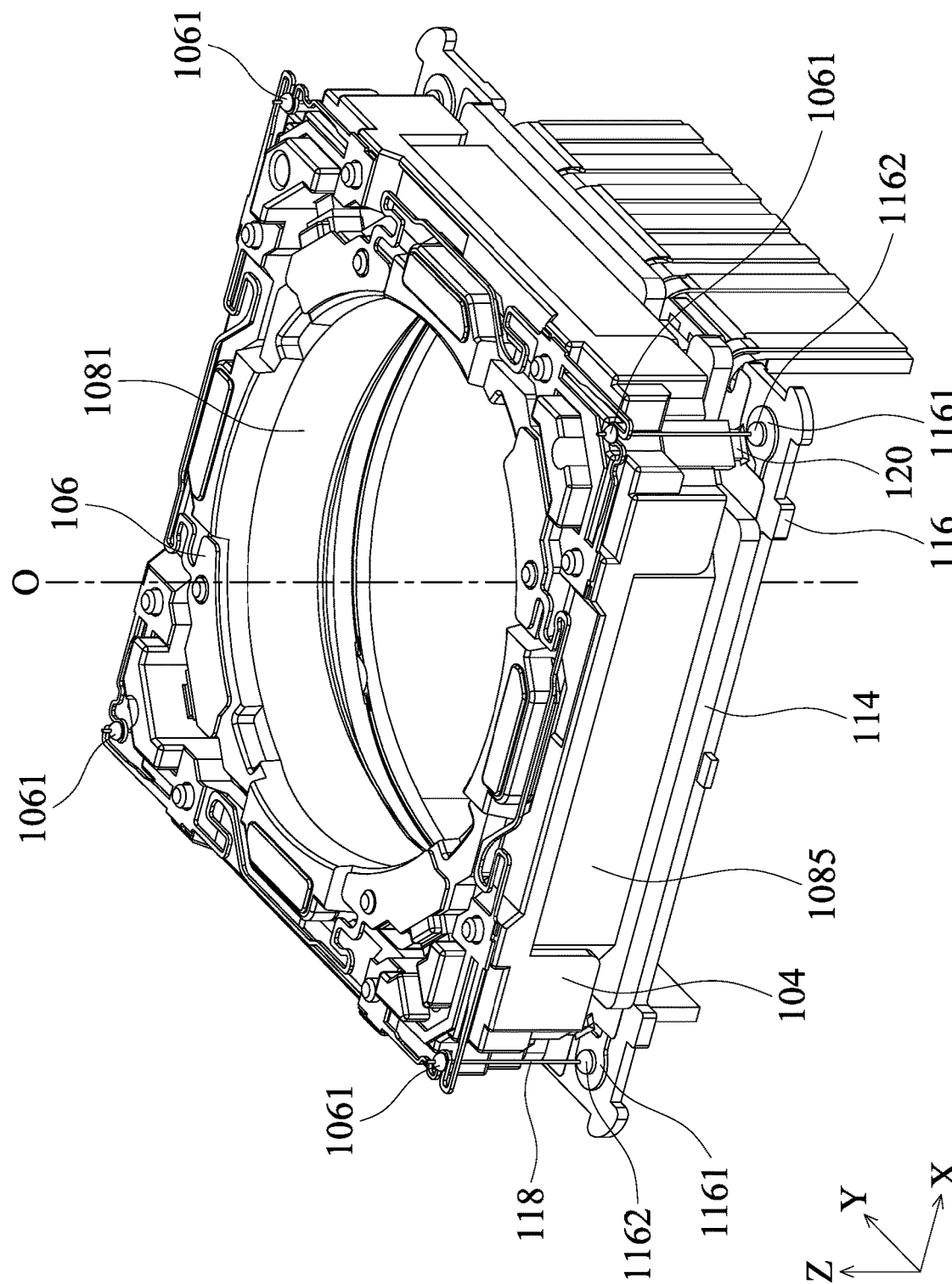
FIG. 2 shows a perspective diagram of the lens driving system in FIG. 1 according to the embodiment of the disclosure.

Please refer to FIG. 1 and FIG. 2 together, and FIG. 2 shows a perspective diagram of the lens driving system 100 (the metal cover 102 is omitted in FIG. 2 for clearly showing the inner structure of the lens driving system 100). As shown in FIG. 1 and FIG. 2, a lens unit can be defined to include the lens holder 1081 and an optical lens in the lens holder 1081 (not shown in the figures). A lens driving assembly can be defined to include the second coil 1083 and the magnetic elements 1085, and the second coil 1083 is affixed to the outer side of the lens holder 1081. The frame 104 has four grooves 1041 for accommodating the four magnetic elements 1085. The upper spring sheet 106 and the lower spring sheet 110 are movably connected to the lens holder 1081 and the frame 104. When a current is applied to the second coil 1083, the four magnetic elements 1085 can respectively act with the second coil 1083 to generate the electromagnetic force, so as to drive the lens holder 1081 to move relative to the frame 104 along an optical axis (the Z-axis), so as to perform the function of auto focusing. In addition, as shown in FIG. 1, the second coil 1083 and the first coil 1141 are both located on an upper side of the metal substrate 116.

In addition, as shown in FIG. 1 and FIG. 2, the lens driving system 100 further includes four resilient elements 118, and each resilient element 118 has a long-strip structure, such as having a column-shaped structure or a line-shaped structure, but the shape of the resilient element 118 is not limited thereto. As shown in FIG. 2, one end of each resilient element 118 is connected to the upper spring sheet 106 through a connecting pad 1061, and the connecting pad 1061 can be a conductive glue or a metal solder, so that the resilient element 118 can be electrically connected to the second coil 1083 through the upper spring sheet 106. Moreover, the metal substrate 116 includes an electrical connecting portion 1161, and the other end of the resilient element 118 is connected to the electrical connecting portion 1161 via solder 1162, so that the resilient element 118 can be electrically connected to the metal substrate 116. Based on the previous structural configuration, the lens holder 1081, the optical element held by the lens holder 1081 and the frame 104 can move relative to the metal substrate 116 along a direction parallel to the XY plane through the four flexible resilient elements 118, so as to achieve the purpose of optical image stabilization (OIS).

As shown in FIG. 2, the lens driving system 100 further includes a damping element 120, which connects the frame 104 with the metal substrate 116 of the circuit module 112. For example, the damping element 120 can be a gel for connecting the frame 104 with the metal substrate 116, but it is not limited thereto.

Figure 3:
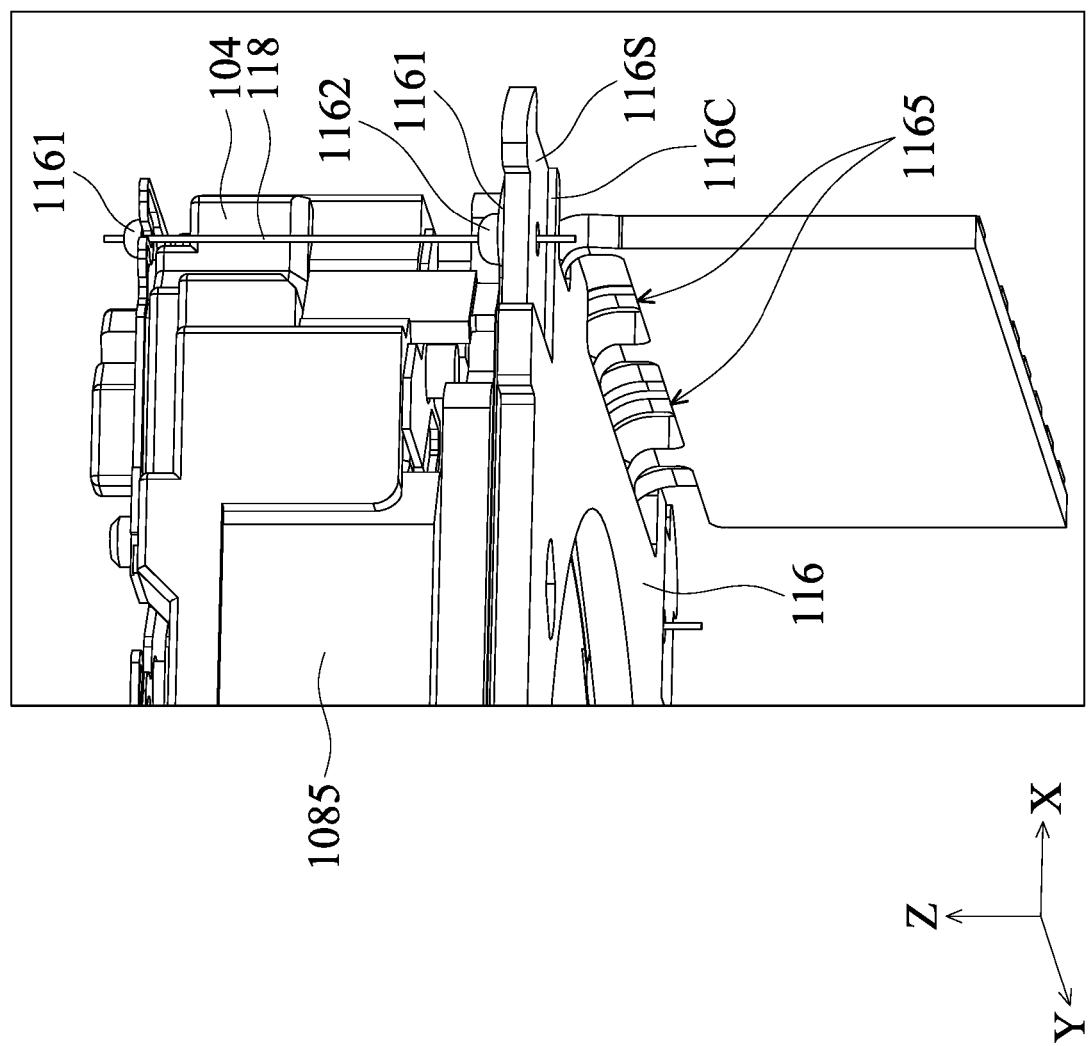
FIG. 3 is a partial structural diagram in another view of the lens driving system in FIG. 2 according to the embodiment of the disclosure.

Please refer to FIG. 3, which is a partial structural diagram in another view of the lens driving system 100 in FIG. 2 according to the embodiment of the disclosure. As shown in FIG. 3, a groove 116 C is formed on the bottom of the metal substrate 116, and the slot 116 C corresponds to the resilient element 118. After the resilient element 118 is connected to the electrical connecting portion 1161 on the metal substrate 116 through the solder 1162, a cutting tool can move along a surface 116S (parallel to the XY plane) of the groove 116 C to cut off the unnecessary part of the resilient element 118, so as to prevent the resilient element 118 from contacting other elements or external elements to cause a short circuit.

Figure 4:
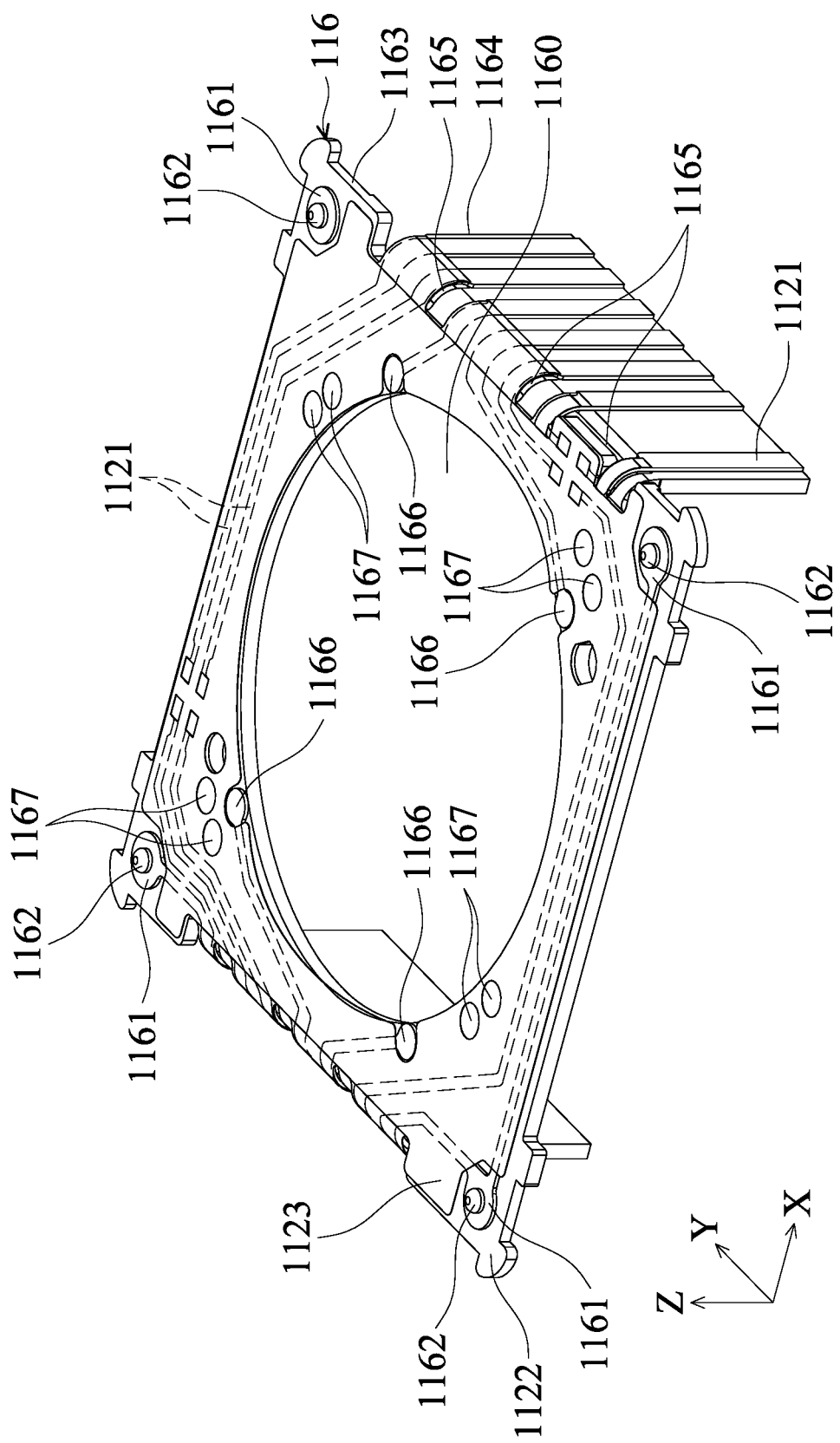
FIG. 4 is a diagram of the metal substrate in FIG. 1 according to the embodiment of the disclosure.

Please refer to FIG. 4, which is a diagram of the metal substrate 116 in FIG. 1 according to the embodiment of the disclosure. For example, the metal substrate 116 can be disposed on a main board (not shown in the figures) inside the portable electronic device mentioned before. As shown in FIG. 4, the metal substrate 116 includes a main body 1163 with a plate shape, a bent portion 1164 and a through hole 1160. The through hole 1160 is located on the center of the main body 1163, and external light passing through the optical element travels through the through hole 1160 and arrives at a sensing element (not shown in the figures) under the metal substrate 116. Then, the sensing element generates a digital image after receiving the external light.

As shown in FIG. 4, the bent portion 1164 bends relative to the main body 1163, and the metal substrate 116 further includes at least one opening 1165, located between the main body 1163 and the bent portion 1164. In this embodiment, the included angle between the bent portion 1164 and the main body 1163 is substantially 90 degrees, but it is not limited thereto. The circuit module 112 can further include a plurality of wires 1121 and an insulating layer 1122. The insulating layer 1122 is disposed on the metal substrate 116 and is located between the metal substrate 116 and the wires 1121, so that the wires 1121 are not electrically connected to the metal substrate 116. In particular, the area of the insulating layer 1122 is larger than the area of the wires 1121, and the area of the insulating layer 1122 is larger than the circuit board 114. In addition, it should be noted that at least one portion of the wires 1121 (circuit element) and the insulating layer 1122 under the wires 1121 are extended from the main body 1163 across the opening 1165 and arrive at the bent portion 1164, so as to prevent the wires 1121 from being damaged in the bending procedure.

The circuit module 112 can further include a protecting layer 1123, which is made of an insulating material. The shape of the protecting layer 1123 substantially corresponds to the main body 1163, and the protecting layer 1123 is configured to cover the wires 1121 for preventing the wires 1121 from being electrically connected to other elements to cause a short circuit. In addition, the wires 1121 located on the bent portion 1164 can be connected to the main board in the manner of welding.

Figure 5:
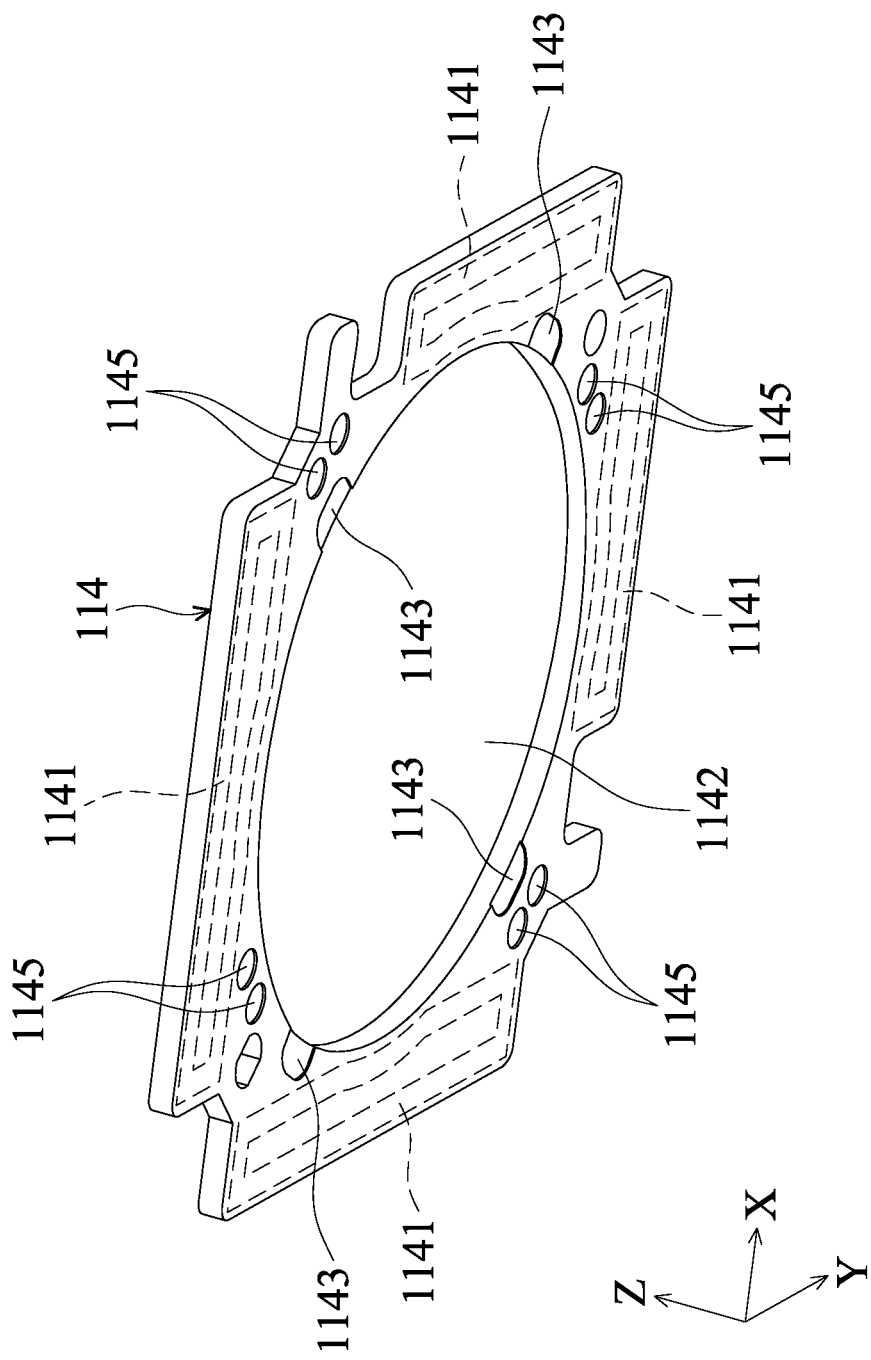
FIG. 5 is a diagram of the circuit board of the circuit module in FIG. 1 according to the embodiment of the disclosure.

Please refer to FIG. 4 and FIG. 5 together. FIG. 5 is a diagram of the circuit board 114 in FIG. 1 according to the embodiment of the disclosure. The circuit board 114 includes a hole 1142 and four first contacts 1143, and the size of the hole 1142 corresponds to the through hole 1160 (the hole 1142 is substantially equal to the through hole 1160). The first contacts 1143 are configured to be respectively electrically connected to the first coil 1141. It should be noted that the circuit board 114 is connected to the metal substrate 116 using the surface-mount technology (SMT). For example, there are four second contacts 1166 (as shown in FIG. 4) disposed on the metal substrate 116. The second contacts 1166 respectively correspond to the first contacts 1143, and the first contacts 1143 and the second contacts 1166 are electrically connected to each other via the solder. Specifically, the first contacts 1143 and the second contacts 1166 can have circular structures, but they are not limited thereto. For example, as shown in FIG. 4 and FIG. 5, the second contacts 1166 have the circular structures, but the first contacts 1143 have non-circular structures.

In addition, eight first metal pads 1145 are further disposed on the circuit board 114, and eight second metal pads 1167 corresponding to the eight first metal pads 1145 are disposed on the metal substrate 116. The first metal pads 1145 are electrically separated from each other, and the second metal pads 1167 are electrically separated from each other as well. It should be noted that the first contacts 1143, the second contacts 1166, the first metal pads 1145 and the second metal pads 1167 are mainly used for connecting the circuit board 114 with the metal substrate 116, and the amounts and the shapes of the first contacts 1143, the second contacts 1166, the first metal pads 1145 and the second metal pads 1167 are not limited to this embodiment.

In the procedure of assembling the circuit board 114 and the metal substrate 116, the solder can be applied to the second contacts 1166 of the metal substrate 116 and the second metal pads 1167 first, and then the circuit board 114 is correspondingly disposed on the metal substrate 116. After that, the circuit board 114 and the metal substrate 116 is in a tin furnace process, and the solder is melted to affix the circuit board 114 to the metal substrate 116. The circuit board 114 can be more securely affixed to the metal substrate 116 due to the configuration of the first metal pads 1145 and the second metal pads 1167. More importantly, there can be no additional positioning structure on the metal substrate 116 or the circuit board 114. That is, the circuit board 114 can be positioned on and affixed to the metal substrate 116 only by the connections of the first metal pads 1145 and the second metal pads 1167, so as to achieve the purpose of increasing structural strength and mechanical miniaturization.

Figure 6:
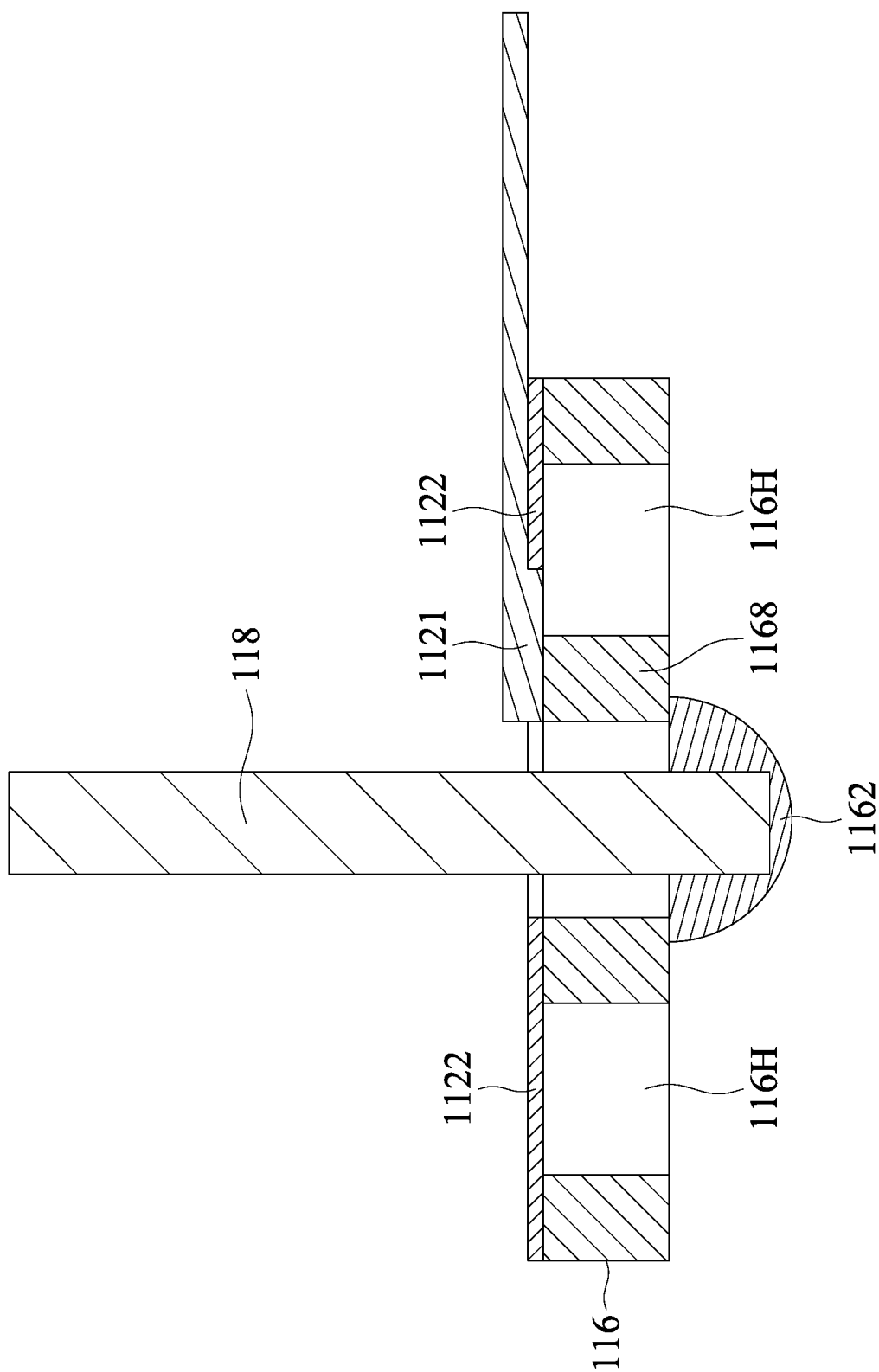
FIG. 6 is a cross-sectional view of the resilient element connected to the metal substrate according to another embodiment of the present disclosure.

Please refer to FIG. 6, which is a cross-sectional view of the metal substrate 116 and the resilient element 118 according to another embodiment of the present disclosure. The metal substrate 116 includes a through hole 116H and an electrical connecting portion 1168. The electrical connecting portion 1168 is formed inside the through hole 116H and is surrounded by the through hole 116H. The electrical connecting portion 1168 is connected to the insulating layer 1122 and the wire 1121. The resilient element 118 is extended through the through hole 116H and is connected to the electrical connecting portion 1168 via the solder 1162. It should be noted that the electrical connecting portion 1168 is a portion of the metal substrate 116, so that the resilient element 118 can be electrically connected to the wire 1121 on the insulating layer 1122 via the electrical connecting portion 1168. Because of this configuration, the length of the resilient element 118 can be extended, so that the resilient element 118 can be protruded out of the bottom side of the metal substrate 116, so as to increase the flexibility of the resilient element 118.

In conclusion, the present disclosure provides the lens driving system 100 for driving an optical lens for focusing. The metal substrate 116 of the circuit module 112 is directly adopted in the lens driving system 100 to serve as a base. Therefore, in contrast to the conventional base made of a plastic material, the thickness of the metal substrate 116 can be smaller and the structural strength is better, so as to achieve the purpose of the miniaturization of the lens driving system 100.

More specifically, several first contacts 1143 are disposed on the circuit board 114, and several corresponding second contacts 1166 are disposed on the metal substrate 116. The first contacts 1143 and the second contacts 1166 can be connected to each other via the solder, so that the circuit board 114 is electrically connected to the metal substrate 116. Moreover, several first metal pads 1145 are disposed on the circuit board 114, and several corresponding second metal pads 1167 are disposed on the metal substrate 116. The first metal pads 1145 and the second metal pads 1167 can be connected to each other via the solder, so as to affix and position the circuit board 114 on the metal substrate 116. There can be no additional positioning structure, so that the manufacturing cost is reduced, and the purpose of mechanical miniaturization can be achieved.

In addition, because the lens driving system adopts the metal substrate 116, the lines of magnetic force between the magnetic elements 1085 and the first coil 1141 can be guided by the metal substrate 116 to be more concentrated. Therefore, the current for driving the first coil 1141 can be smaller, so as to decrease the power consumption of the lens driving system 100.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An optical element driving mechanism, comprising:
   a fixed portion, having a main axis, wherein when viewed in a direction which is parallel to the main axis, the fixed portion has a polygonal structure; and
   a movable portion, connected to an optical element having an optical axis, wherein the movable portion is movable relative to the fixed portion;
   a driving assembly, comprising:
      a first driving element;
      a second driving element, corresponding the first driving element and driving the movable portion to move relative to the fixed portion;
      a first circuit element, having a first circuit;
      a second circuit element, having a second circuit, wherein the first circuit element and the second circuit element are arranged along the direction which is parallel to the main axis;
      a first circuit connecting portion, configured to be electrically connected to the first circuit, wherein the first circuit is a first coil, wherein the first circuit element is electrically connected to the second circuit element via the first circuit connecting portion; and
      a plurality of metal pads, disposed on the first circuit element and the second circuit element, the metal pads disposed on the first circuit element are electrically separated from each other, and the metal pads disposed on the second circuit element are electrically separated from each other,
   wherein when viewed in a first direction which is perpendicular to the main axis, the first circuit connecting portion is located between the first circuit element and the second circuit element, and when viewed in the direction which is parallel to the main axis, the first circuit element, the second circuit element and the first circuit connecting portion at least partially overlap each other.

2. The optical element driving mechanism as claimed in claim 1, wherein the first circuit element is fixedly connected to the second circuit element via the metal pad, and when viewed in the first direction, the metal pad is located between the first circuit element and the second circuit element, and when viewed in a direction which is parallel to the main axis, the first circuit element, the second circuit element and the metal pad at least partially overlap each other, and the metal pad is electrically independent of the second driving element.

3. The optical element driving mechanism as claimed in claim 2, wherein when viewed in the direction which is parallel to the main axis, the main axis is surrounded by the metal pads.

4. The optical element driving mechanism as claimed in claim 2, wherein the metal pad is made of metal material.

5. The optical element driving mechanism as claimed in claim 1, wherein when viewed in the direction of the main axis, the first circuit connecting portion is located at a corner of the fixed portion.

6. The optical element driving mechanism as claimed in claim 1, wherein the first circuit element further has a first opening, the optical axis passes through the first opening, and the first circuit connecting portion is adjacent to the first opening.

7. The optical element driving mechanism as claimed in claim 1, wherein the first circuit element and the second circuit element each has a plate-like structure extending in an extending direction, and the extending direction of the first circuit element is parallel to the extending direction of the second circuit element.

8. The optical element driving mechanism as claimed in claim 1, wherein the fixed portion further comprises an outer frame, which is fixedly connected to the second circuit element by soldering.

9. The optical element driving mechanism as claimed in claim 8, wherein the second circuit element further comprises a protruding portion, corresponding to the outer frame.

10. The optical element driving mechanism as claimed in claim 1, wherein the second circuit has a flat-plate structure and comprises a bending portion, wherein the bending portion extends along a direction which is not perpendicular to the main axis, and when viewed in the direction which is parallel to the main axis, the bending portion of the second circuit does not overlap any bending portions of the second circuit element.

11. An optical element driving mechanism, comprising:
a fixed portion, having a main axis, wherein when viewed in a direction which is parallel to the main axis, the fixed portion has a polygonal structure;
a movable portion, which is movable relative to the fixed portion, comprising:
  a holder, connected to an optical element having an optical axis; and
  a frame, wherein the holder is movable relative to the frame;
a driving assembly, comprising:
  a first driving element;
  a second driving element, corresponding to the first driving element and driving the movable portion to move relative to the fixed portion;
  a first circuit element, having a first circuit, and the first circuit comprises a third driving element corresponding to the first driving element;
  a second circuit element, having a second circuit, wherein the first circuit element and the second circuit element are arranged along the direction which is parallel to the main axis;
  a first circuit connecting portion, configured to be electrically connected to the first circuit, wherein the first circuit is a first coil, wherein the first circuit element is electrically connected to the second circuit element via the first circuit connecting portion; and
  a plurality of metal pads, disposed on the first circuit element and the second circuit element, the metal pads disposed on the first circuit element are electrically separated from each other, and the metal pads disposed on the second circuit element are electrically separated from each other,
wherein when viewed in a first direction which is perpendicular to the main axis, the first circuit connecting portion is located between the first circuit element and the second circuit element, and when viewed in the direction which is parallel to the main axis, the first circuit element, the second circuit element and the first circuit connecting portion at least partially overlap each other.

12. The optical module as claimed in claim 1, wherein the fixed portion further comprises:
  a case, having a top wall and a side wall extending along the optical axis from an edge of the top wall; and
  a frame, having a plurality of pillars extending along the optical axis.

13. The optical element driving mechanism as claimed in claim 12, wherein the driving assembly further comprises a second connecting portion, and the second driving element is electrically connected to the second circuit element via the second connecting portion.

14. The optical element driving mechanism as claimed in claim 13, wherein the second circuit element comprises:
  a first surface, facing a direction, wherein the first circuit connecting portion is disposed on the first surface; and
  a second surface, facing a different direction than the first surface, wherein the second circuit connecting portion is disposed on the second surface.

15. The optical element driving mechanism as claimed in claim 13, wherein when viewed in the direction which is parallel to the main axis, the first circuit connecting portion and the second circuit connecting portion are located at a corner of the fixed portion.

16. The optical element driving mechanism as claimed in claim 13, further comprising an elastic element, passing through the second circuit connecting portion.

17. The optical element driving mechanism as claimed in claim 12, wherein the second driving element is electrically independent of the first circuit element.

18. The optical element driving mechanism as claimed in claim 11, wherein the first circuit element is fixedly connected to the second circuit element via the metal pad, and when viewed in the first direction, the metal pad is located between the first circuit element and the second circuit element, and when viewed in a direction which is parallel to the main axis, the first circuit element, the second circuit element and the metal pad at least partially overlap each other, and the metal pad is electrically independent of the driving assembly.

19. The optical element driving mechanism as claimed in claim 18, wherein the metal pad is made of metal material.

* * * * *